United States Patent
Garcia-Luna-Aceves

(10) Patent No.: US 9,503,358 B2
(45) Date of Patent: Nov. 22, 2016

(54) DISTANCE-BASED ROUTING IN AN INFORMATION-CENTRIC NETWORK

(71) Applicant: Palo Alto Research Center Incorporated, Palo Alto, CA (US)

(72) Inventor: Jose J. Garcia-Luna-Aceves, San Mateo, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 14/098,398

(22) Filed: Dec. 5, 2013

(65) Prior Publication Data
US 2015/0163127 A1 Jun. 11, 2015

(51) Int. Cl.
*H04L 12/721* (2013.01)
*H04L 12/741* (2013.01)
(Continued)

(52) U.S. Cl.
CPC ............... *H04L 45/14* (2013.01); *H04L 43/10* (2013.01); *H04L 45/02* (2013.01); *H04L 45/16* (2013.01); *H04L 45/18* (2013.01); *H04L 45/38* (2013.01); *H04L 45/74* (2013.01); *H04L 67/327* (2013.01)

(58) Field of Classification Search
CPC ............ H04L 29/12009; H04L 29/08; H04L 45/123; H04L 45/122; H04L 45/16; H04L 45/02; H04L 45/742; H04L 45/20; H04L 45/48; H04L 12/56; H04L 12/48; H04L 12/56891; H04L 67/327; H04L 43/10
USPC ............... 709/213, 217, 224, 238, 241, 242; 370/256, 390, 389, 392
See application file for complete search history.

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Hoque et al., "NLSR: Named-data Link State Routing Protocol", Aug. 12, 2013, ICN 2013, pp. 15-20.*

(Continued)

*Primary Examiner* — Vivek Srivastava
*Assistant Examiner* — Todd L Barker
(74) *Attorney, Agent, or Firm* — Shun Yao; Park, Vaughan, Fleming & Dowler LLP

(57) ABSTRACT

One embodiment of the present invention provides a computing system. The computing system includes a processor and a computer-readable storage medium. The computer-readable storage medium stores instructions which when executed by the processor cause the processor to perform a method. The method comprises identifying an identifier of an anchor node associated with a name in an update message received from a neighbor node. The anchor node stores a content object identifiable based on the name independent of the anchor node. The method also comprises determining a valid next-hop neighbor in the ICN for the name based on a sequence number of the update message generated by the anchor node and lexicographic order of an identifier of the neighbor node; and determining whether the anchor node is a designated anchor node based on the validity of the next-hop neighbor and a routing metric for the anchor node.

24 Claims, 12 Drawing Sheets

(51) Int. Cl.
*H04L 12/751* (2013.01)
*H04L 12/761* (2013.01)
*H04L 12/705* (2013.01)
*H04L 29/08* (2006.01)
*H04L 12/26* (2006.01)

(56) References Cited

U.S. PATENT DOCUMENTS

| | | | |
|---|---|---|---|
| 4,921,898 A | 5/1990 | Lenney | |
| 5,070,134 A | 12/1991 | Oyamada | |
| 5,101,348 A * | 3/1992 | Arrowood | H04L 45/02 709/224 |
| 5,110,856 A | 5/1992 | Oyamada | |
| 5,455,865 A * | 10/1995 | Perlman | H04L 29/06 370/389 |
| 5,506,844 A | 4/1996 | Rao | |
| 5,629,370 A | 5/1997 | Freidzon | |
| 5,870,605 A | 2/1999 | Bracho | |
| 6,052,683 A | 4/2000 | Irwin | |
| 6,091,724 A | 7/2000 | Chandra | |
| 6,173,364 B1 | 1/2001 | Zenchelsky | |
| 6,192,043 B1 * | 2/2001 | Rochberger | H04L 45/10 370/238 |
| 6,226,618 B1 | 5/2001 | Downs | |
| 6,233,646 B1 | 5/2001 | Hahm | |
| 6,332,158 B1 | 12/2001 | Risley | |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 * | 12/2003 | Corson | H04L 45/02 370/238 |
| 6,681,220 B1 | 1/2004 | Kaplan | |
| 6,681,326 B2 | 1/2004 | Son | |
| 6,769,066 B1 | 7/2004 | Botros | |
| 6,772,333 B1 | 8/2004 | Brendel | |
| 6,862,280 B1 | 3/2005 | Bertagna | |
| 6,901,452 B1 | 5/2005 | Bertagna | |
| 6,917,985 B2 | 7/2005 | Madruga | |
| 6,968,393 B1 * | 11/2005 | Chen | H04L 45/02 370/351 |
| 6,981,029 B1 | 12/2005 | Menditto | |
| 7,013,389 B1 * | 3/2006 | Srivastava et al. | 713/163 |
| 7,031,308 B2 * | 4/2006 | Garcia-Luna-Aceves et al. | 370/390 |
| 7,031,321 B2 * | 4/2006 | Habetha | H04L 45/028 370/252 |
| 7,061,877 B1 | 6/2006 | Gummalla | |
| 7,206,860 B2 | 4/2007 | Murakami | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,382,787 B1 | 6/2008 | Barnes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,543,064 B2 | 6/2009 | Juncker | |
| 7,552,233 B2 | 6/2009 | Raju et al. | |
| 7,555,482 B2 | 6/2009 | Korkus | |
| 7,555,563 B2 | 6/2009 | Ott | |
| 7,567,547 B2 * | 7/2009 | Mosko et al. | 370/351 |
| 7,567,946 B2 | 7/2009 | Andreoli | |
| 7,580,971 B1 | 8/2009 | Gollapudi | |
| 7,623,535 B2 | 11/2009 | Guichard | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 * | 4/2010 | Ogier et al. | 709/242 |
| 7,769,887 B1 | 8/2010 | Bhattacharyya | |
| 7,779,467 B2 | 8/2010 | Choi | |
| 7,801,177 B2 * | 9/2010 | Luss | 370/468 |
| 7,816,441 B2 | 10/2010 | Elizalde | |
| 7,831,733 B2 * | 11/2010 | Sultan et al. | 709/238 |
| 7,908,337 B2 | 3/2011 | Garcia-Luna-Aceves | |
| 7,924,837 B1 | 4/2011 | Shabtay | |
| 7,953,885 B1 | 5/2011 | Devireddy | |
| 8,000,267 B2 * | 8/2011 | Solis et al. | 370/256 |
| 8,010,691 B2 | 8/2011 | Kollmansberger | |
| 8,074,289 B1 | 12/2011 | Carpentier | |
| 8,117,441 B2 | 2/2012 | Kurien | |
| 8,160,069 B2 * | 4/2012 | Jacobson et al. | 370/392 |
| 8,185,653 B2 * | 5/2012 | Yau | H04L 45/36 709/202 |
| 8,204,060 B2 * | 6/2012 | Jacobson et al. | 370/392 |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,312,064 B1 | 11/2012 | Gauvin | |
| 8,386,622 B2 * | 2/2013 | Jacobson | 709/229 |
| 8,467,297 B2 * | 6/2013 | Liu et al. | 370/238 |
| 8,553,562 B2 * | 10/2013 | Allan et al. | 370/238 |
| 8,572,214 B2 | 10/2013 | Garcia-Luna-Aceves | |
| 8,654,649 B2 * | 2/2014 | Vasseur et al. | 370/238 |
| 8,665,757 B2 * | 3/2014 | Kling et al. | 370/256 |
| 8,667,172 B2 * | 3/2014 | Ravindran et al. | 709/238 |
| 8,688,619 B1 | 4/2014 | Ezick | |
| 8,699,350 B1 * | 4/2014 | Kumar et al. | 370/238 |
| 8,750,820 B2 * | 6/2014 | Allan et al. | 455/403 |
| 8,761,022 B2 * | 6/2014 | Chiabaut | H04L 45/12 370/238 |
| 8,762,477 B2 * | 6/2014 | Xie et al. | 709/213 |
| 8,762,570 B2 * | 6/2014 | Qian et al. | 709/241 |
| 8,762,707 B2 | 6/2014 | Killian | |
| 8,767,627 B2 * | 7/2014 | Ezure et al. | 370/328 |
| 8,817,594 B2 * | 8/2014 | Gero et al. | 370/217 |
| 8,826,381 B2 * | 9/2014 | Kim | 726/3 |
| 8,832,302 B1 | 9/2014 | Bradford | |
| 8,836,536 B2 | 9/2014 | Marwah | |
| 8,862,774 B2 * | 10/2014 | Vasseur et al. | 709/239 |
| 8,903,756 B2 | 12/2014 | Zhao | |
| 8,937,865 B1 | 1/2015 | Kumar | |
| 9,071,498 B2 | 6/2015 | Beser | |
| 9,112,895 B1 | 8/2015 | Lin | |
| 2002/0010795 A1 | 1/2002 | Brown | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0176404 A1 | 11/2002 | Girard | |
| 2002/0188605 A1 | 12/2002 | Adya | |
| 2002/0199014 A1 | 12/2002 | Yang | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0074472 A1 | 4/2003 | Lucco | |
| 2003/0097447 A1 | 5/2003 | Johnston | |
| 2003/0140257 A1 | 7/2003 | Paterka | |
| 2004/0024879 A1 | 2/2004 | Dingman | |
| 2004/0030602 A1 | 2/2004 | Rosenquist | |
| 2004/0073715 A1 | 4/2004 | Folkes | |
| 2004/0139230 A1 | 7/2004 | Kim | |
| 2004/0221047 A1 | 11/2004 | Grover | |
| 2004/0225627 A1 | 11/2004 | Botros | |
| 2004/0252683 A1 | 12/2004 | Kennedy | |
| 2005/0003832 A1 * | 1/2005 | Osafune et al. | 455/456.1 |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0074001 A1 | 4/2005 | Mattes | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0289222 A1 | 12/2005 | Sahim | |
| 2006/0010249 A1 * | 1/2006 | Sabesan et al. | 709/238 |
| 2006/0029102 A1 | 2/2006 | Abe | |

(56) References Cited

U.S. PATENT DOCUMENTS

| | | |
|---|---|---|
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1* | 10/2007 | Retana et al. ............ 709/238 |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1* | 5/2008 | Jetcheva et al. ............ 370/238 |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1* | 11/2009 | Jacobson et al. ............ 726/22 |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1* | 11/2010 | Allan et al. ............ 370/256 |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | van der Linden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1* | 5/2012 | Farkas et al. ............ 370/235 |
| 2012/0136676 A1 | 5/2012 | Goodall |

(56) References Cited

U.S. PATENT DOCUMENTS

| | | | |
|---|---|---|---|
| 2012/0136936 A1 | 5/2012 | Quintuna | |
| 2012/0136945 A1 | 5/2012 | Lee | |
| 2012/0137367 A1 | 5/2012 | Dupont | |
| 2012/0141093 A1 | 6/2012 | Yamaguchi | |
| 2012/0155464 A1 | 6/2012 | Kim | |
| 2012/0158973 A1 | 6/2012 | Jacobson | |
| 2012/0163373 A1 | 6/2012 | Lo | |
| 2012/0179653 A1 | 7/2012 | Araki | |
| 2012/0197690 A1 | 8/2012 | Agulnek | |
| 2012/0198048 A1 | 8/2012 | Ioffe | |
| 2012/0221150 A1 | 8/2012 | Arensmeier | |
| 2012/0224487 A1* | 9/2012 | Hui et al. | 370/238 |
| 2012/0257500 A1 | 10/2012 | Lynch | |
| 2012/0284791 A1 | 11/2012 | Miller | |
| 2012/0290669 A1 | 11/2012 | Parks | |
| 2012/0290919 A1 | 11/2012 | Melnyk | |
| 2012/0291102 A1 | 11/2012 | Cohen | |
| 2012/0314580 A1 | 12/2012 | Hong | |
| 2012/0317307 A1* | 12/2012 | Ravindran et al. | 709/238 |
| 2012/0331112 A1 | 12/2012 | Chatani | |
| 2013/0039249 A1* | 2/2013 | Ravindran | H04W 4/18 370/312 |
| 2013/0041982 A1 | 2/2013 | Shi | |
| 2013/0051392 A1 | 2/2013 | Filsfils | |
| 2013/0060962 A1 | 3/2013 | Wang | |
| 2013/0073552 A1 | 3/2013 | Rangwala | |
| 2013/0074155 A1 | 3/2013 | Huh | |
| 2013/0091539 A1 | 4/2013 | Khurana | |
| 2013/0110987 A1* | 5/2013 | Kim et al. | 709/219 |
| 2013/0111063 A1 | 5/2013 | Lee | |
| 2013/0151584 A1* | 6/2013 | Westphal | 709/202 |
| 2013/0163426 A1 | 6/2013 | Beliveau | |
| 2013/0166668 A1 | 6/2013 | Byun | |
| 2013/0173822 A1 | 7/2013 | Hong | |
| 2013/0182568 A1* | 7/2013 | Lee et al. | 370/231 |
| 2013/0185406 A1 | 7/2013 | Choi | |
| 2013/0188513 A1* | 7/2013 | Vasseur | H04W 40/248 370/254 |
| 2013/0197698 A1 | 8/2013 | Shah | |
| 2013/0198119 A1 | 8/2013 | Eberhardt, III | |
| 2013/0219038 A1 | 8/2013 | Lee | |
| 2013/0219081 A1 | 8/2013 | Qian | |
| 2013/0219478 A1* | 8/2013 | Mahamuni et al. | 726/6 |
| 2013/0223237 A1* | 8/2013 | Hui et al. | 370/250 |
| 2013/0227166 A1 | 8/2013 | Ravindran | |
| 2013/0242996 A1* | 9/2013 | Varvello | H04L 67/327 370/392 |
| 2013/0250809 A1* | 9/2013 | Hui | H04W 40/023 370/255 |
| 2013/0282854 A1* | 10/2013 | Jang et al. | 709/213 |
| 2013/0282860 A1* | 10/2013 | Zhang et al. | 709/217 |
| 2013/0282920 A1* | 10/2013 | Zhang et al. | 709/238 |
| 2013/0304937 A1* | 11/2013 | Lee | 709/238 |
| 2013/0329696 A1 | 12/2013 | Xu | |
| 2013/0336323 A1 | 12/2013 | Srinivasan | |
| 2013/0343408 A1 | 12/2013 | Cook | |
| 2014/0003232 A1 | 1/2014 | Guichard | |
| 2014/0006565 A1* | 1/2014 | Muscariello et al. | 709/219 |
| 2014/0029445 A1* | 1/2014 | Hui et al. | 370/248 |
| 2014/0032714 A1* | 1/2014 | Liu et al. | 709/217 |
| 2014/0040505 A1 | 2/2014 | Barton | |
| 2014/0074730 A1 | 3/2014 | Arensmeier | |
| 2014/0075567 A1 | 3/2014 | Raleigh | |
| 2014/0082135 A1 | 3/2014 | Jung | |
| 2014/0089454 A1* | 3/2014 | Jeon et al. | 709/213 |
| 2014/0096249 A1 | 4/2014 | Dupont | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0156396 A1 | 6/2014 | deKozan | |
| 2014/0165207 A1 | 6/2014 | Engel | |
| 2014/0172783 A1 | 6/2014 | Suzuki | |
| 2014/0172981 A1 | 6/2014 | Kim | |
| 2014/0173034 A1 | 6/2014 | Liu | |
| 2014/0192717 A1 | 7/2014 | Liu | |
| 2014/0195328 A1 | 7/2014 | Ferens | |
| 2014/0195666 A1 | 7/2014 | Dumitriu | |
| 2014/0233575 A1* | 8/2014 | Xie et al. | 370/400 |
| 2014/0237085 A1 | 8/2014 | Park | |
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0286334 A1* | 9/2014 | Allan | H04L 45/00 370/389 |
| 2014/0289325 A1 | 9/2014 | Solis | |
| 2014/0289790 A1 | 9/2014 | Wilson | |
| 2014/0314093 A1 | 10/2014 | You | |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0063802 A1 | 3/2015 | Bahadur | |
| 2015/0095481 A1 | 4/2015 | Ohnishi | |
| 2015/0095514 A1 | 4/2015 | Yu | |
| 2015/0188770 A1 | 7/2015 | Naiksatam | |
| 2015/0304207 A1* | 10/2015 | Axnas | H04W 40/02 370/238 |

FOREIGN PATENT DOCUMENTS

| | | | |
|---|---|---|---|
| EP | 0295727 | A2 | 12/1988 |
| EP | 0755065 | A2 | 7/1996 |
| EP | 1077422 | A2 | 2/2001 |
| EP | 1384729 | A1 | 1/2004 |
| EP | 2124415 | A2 | 11/2009 |
| EP | 2214357 | A1 | 8/2010 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2007113180 | A1 | 10/2007 |
| WO | 2007144388 | A1 | 12/2007 |
| WO | 2011049890 | A1 | 4/2011 |

OTHER PUBLICATIONS

Hoque et al., "OPSFN: An OSPF Based Routing Protocol for Named Data Networking", Jul. 25, 2012, NDN, Technical Report NDN-0003, 2012.*

Biradar et al., "Review of multicast routing mechanisms in mobile ad hoc networks", Aug. 16, Journal of Network and Cmputer Applications 35 (2012), pp. 221-239.*

Merindol et al., "An efficient algorithm to enable path diversity in link state routing networks", Jan. 10, Computer Networks 55 (2011), pp. 1132-1140.*

Soh et al., "Efficient Prefix Updates for IP Router Using Lexicographic Ordering and Updateable Address Set", Jan. 2008, IEEE Transactions on Computers, vol. 57, No. 1.*

Beben et al., "Content Aware Network based on Virtual Infrastructure", 2012 13th ACIS International Conference on Software Engineering.*

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.*

Garcia-Luna-Aceves et al., "Automatic Routing Using Multiple Prefix Labels", 2012, IEEE, Ad Hoc and Sensor Networking Symposium.*

Van Jacobson et al., "Networking Named Content", Dec. 2009, ACM, CoNEXT 2009.*

Detti et al., "Supporting the Web with an information cnetric network that routes by name", Aug. 2012, Computer Networks 56, pp. 3705-3702.*

Nadeem Javaid, "Analysis and design of quality link metrics for routing protocols in Wireless Networks", Universete Paris-Est, 2010.*

(56) References Cited

OTHER PUBLICATIONS

Nadeem Javaid, "Analysis and design of quality link metrics for routing protocols in Wireless Networks", PhD Thesis Defense, Dec. 15, 2010, Universete Paris-Est.*
Hogue et al., "NLSR: Named-data Link State Routing Protocol", Aug. 12, 2013, ICN'13.*
Perkins et al., "Highly Dynamic Destination-Sequenced Distance-Vector Routing (DSDV) for Mobile Computers", Sigcomm 1994, pp. 234-244.*
Perino et al., "A Reality Check for Content Centric Networking", ICN 2011, Aug. 19, 2011, pp. 44-49.*
Perkins et al., "Ad-hoc On-Demand Distance Vector Routing", Second IEEE Workshop on Mobile Computing Systems and Applications, Feb. 25-26, 1999 (11 pages total).*
Royer et al., "A Review of Current Routing Protocols for Ad Hoc Mobile Wireless Networks", IEEE Personal Communications, Apr. 1999, pp. 46-55.*
Jacquet et al., "Optimized Link State Routing Protocol for Ad Hoc Networks", IEEE 2001, pp. 62-68.*
Torres et al., "Controller-based Routing Scheme for Named Data Network", Electrical Engineering Program, COPPE/UFRJ Tech Rep. 2012 (6 pages total).*
Hogue et al., "NLSR: Named-data Link State Routing Protocol", ICN'2013, Aug. 12, 2013, pp. 15-20.*
Wang et al., "Implementing Messaging Using Named Data", AINTEC 2010, Nov. 15-17, 2010, (8 pages total).*
Garcia et al., "A Unified Approach to Loop-Free Routing Using Distance Vectors or Link States", 1989, ACM, pp. 212-223.*
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Lynn$2E.
C. Gentry and A. Silverberg. Hierarchical ID-Based Cryptography. Advances in Cryptology—ASIACRYPT 2002. Springer Berlin Heidelberg (2002).
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

* cited by examiner

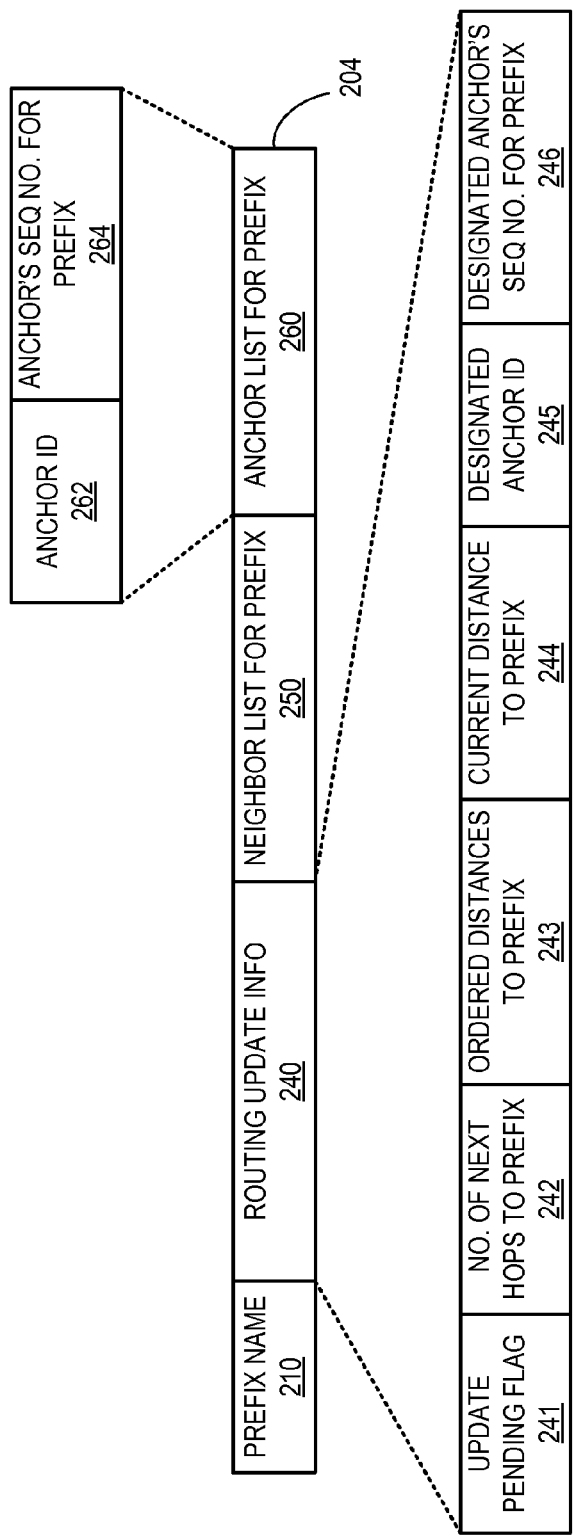
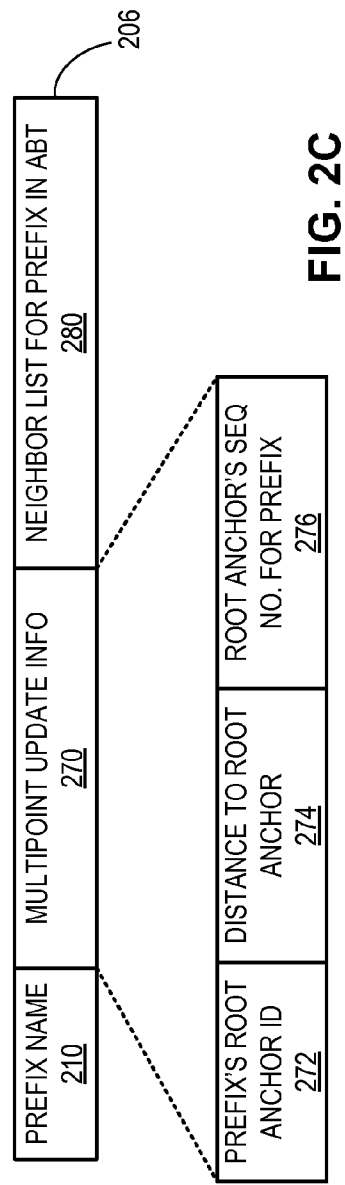
FIG. 2B
FIG. 2C

DISTANCE-BASED ROUTING IN AN INFORMATION-CENTRIC NETWORK

BACKGROUND

1. Field

The present disclosure relates to computer networks. More specifically, the present disclosure relates to a method and system for efficient routing in an information centric network (ICN).

2. Related Art

The exponential growth of user-generated content in the Internet has shifted the Internet usage pattern from host-oriented communication to peer-to-peer and content-based communication. Such a shift has brought with it an increasing demand for efficient addressing and routing for contents. As a result, information centric networking (ICN) architectures have been proposed. The goal of ICN architectures is to enable access to content and services by name, independently of their location, in order to improve network performance and end-user experience.

Typically, network traffic can be viewed at the application level as end-to-end communication for content transfer. In contrast, in an ICN, content is requested or returned based in part on the name given to it, and the ICN is responsible for routing content from the provider to the consumer. Content includes data that can be transported in the communication system, and can be any form of data such as text, images, video, and/or audio. In ICN, a name can refer to the entire content or a portion of the content. For example, a newspaper article can include multiple pieces of content (can be referred to as content objects) represented by one or more names. A piece of content can also be associated with metadata describing or augmenting the piece of content with information such as authentication data, creation date, content owner, etc.

ICN architectures operate based on name resolution and routing of contents (i.e., name-based content routing). In some ICN architectures, the names of data objects are mapped to addresses (e.g., using directory servers). These mapped addresses are then used for content routing. Some other ICN architectures directly use name-based routing of content. In name-based routing, the routers which produce or cache contents (can be referred to as anchors) advertise the existence of local copies of named data objects (NDO) or name prefixes denoting a set of objects with names sharing a common prefix. Based on the advertisements, routes to the produced and/or cached contents are established. Consumers of content issue content requests, which are forwarded along the established routes to the corresponding anchors.

With existing technologies, name-based routing in an ICN typically requires exchange of information regarding the physical network. Usually, these routing techniques use one or more of the following types of mechanisms: (i) maintaining paths to named content or using source routes to content; (ii) flooding of information about the network topology and the location of replicas of content; (iii) flooding of content requests; (iv) establishing spanning trees in an ICN for name-signaling; and (v) maintaining overlays using distributed hash tables (DHT). These mechanism burden the network with extensive calculation, bandwidth overhead, and/or inefficient routing.

While ICN brings many desirable features to content distribution, some issues remain unsolved in efficient name-based routing.

SUMMARY

One embodiment of the present invention provides a computing system in an information-centric network (ICN). The computing system includes a processor and a computer-readable storage medium. The computer-readable storage medium stores instructions which when executed by the processor cause the processor to perform a method. The method comprises identifying an identifier of a first anchor node associated with a name in an update message received from a neighbor node. The first anchor node stores a content object identifiable based on the name, which is independent of the first anchor node. The method also comprises determining a valid next-hop neighbor in the ICN for the name based on a sequence number of the update message generated by the first anchor node and lexicographic order of an identifier of the neighbor node; and determining whether the first anchor node is a designated anchor node based on the validity of the next-hop neighbor and a routing metric for the first anchor node.

In a variation on this embodiment, the routing metric for the first anchor node is equal to routing metric for a second anchor node of the name. The method determines whether the first anchor is a designated anchor node further based on lexicographic order of the identifier of the first anchor node compared to an identifier of the second anchor node In a variation on this embodiment, the method also comprises forwarding the update message from the first anchor node to a neighbor node based on lexicographic order of the identifier of the neighbor node.

In a variation on this embodiment, in response to determining that the first anchor node is not a designated anchor node, the method also comprises precluding the computing system from forwarding the update message from the first anchor node to a neighbor node.

In a variation on this embodiment, in response to determining that the content object requires a multipoint communication, the method also comprises determining the first anchor node to be a root anchor node of the name based on lexicographic order of the identifier of the first anchor node compared to an identifier of a locally known second anchor node of the name.

In a further variation, the method also comprises forwarding an update message, which indicates the first anchor node as the root node to a neighbor node and comprises route information toward the first anchor node. The neighbor node is in a suitable path from the computing system to the second anchor node.

In a further variation, the method also comprises maintaining an anchor-based tree (ABT) rooted at the first anchor node for the name and forwarding a request from the second anchor node for joining the ABT to the first anchor node.

In a further variation, the method also comprises broadcasting a request for the content object via the ABT.

BRIEF DESCRIPTION OF THE FIGURES

FIG. 2B illustrates an exemplary routing table for storing routing information for a respective known prefix, in accordance with an embodiment of the present invention.

FIG. 2C illustrates an exemplary multipoint routing table for storing routing information for prefixes requiring multipoint support based on ABTs, in accordance with an embodiment of the present invention.

In the figures, like reference numerals refer to the same figure elements.

DETAILED DESCRIPTION

Figure 1A:
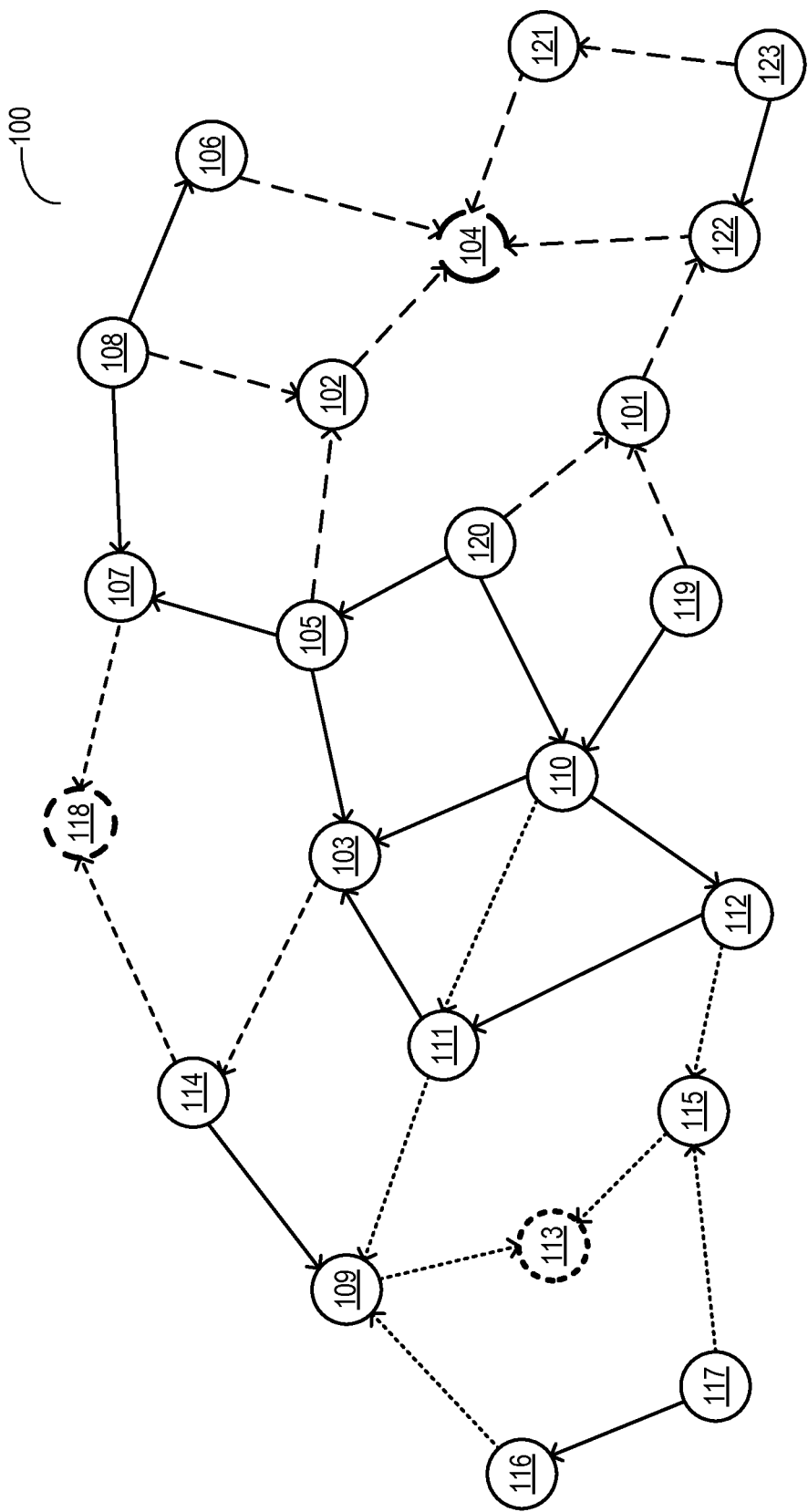
FIG. 1A illustrates an exemplary distance-based routing to a suitable instance of a prefix in an ICN, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently calculating name-based routes in an ICN is solved by performing distance-based routing and calculating one or more loop-free routes to a suitable site (e.g., site with the shortest distance) advertising a named data object or name prefix. These sites can be referred to as anchors.

In ICN, a respective content is named, and each piece of data is bound to a unique name that distinguishes the data from any other piece of data, such as other versions of the same data or data from other sources. This unique name allows a network device to request the data by disseminating an Interest that includes the name (or a name prefix), and can obtain the data independent from the data's storage location, network location, application, and means of transportation. In this disclosure, the terms "name" and "prefix" are used interchangeably. The following terms describe elements of a ICN architecture:

Content Object: A single piece of data, which is bound to a unique name. Content Objects are "persistent," which means that a Content Object can move around within a computing device, or across different computing devices, but does not change. If any component of the Content Object changes, the entity that made the change creates a new Content Object that includes the updated content, binds the new Content Object to a new unique location-independent name.

Unique Names: A name in an ICN (or named-data network) is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, icn, and test.txt can be structured in a left-oriented prefix-major fashion to form the name "/parc/home/icn/test.txt." Thus, the name "/parc/home/icn" can be a "parent" or "prefix" of "/parc/home/icn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (titled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes the name (or name prefix) for the data. A data consumer can disseminate an Interest across a named-data network, which ICN routers can propagate toward a storage device (e.g., a cache server) or a data producer that can provide the a matching Content Object to satisfy the Interest.

With existing name-based routing techniques for an ICN, routing to anchors requires information regarding the physical network topology (i.e., the physical network on which the ICN is established) to attain name-based routing of content. Maintaining topology and anchor information incurs significant overhead. Furthermore, these routing techniques can also rely on other mechanisms, such as flooding of information, establishing spanning tree, and/or creating overlays using distributed hash tables (DHTs). However, these mechanisms may not provide efficient name-based routing. For example, flooding of information may not scale beyond small networks. On the other hand, establishing spanning trees creates bottlenecks and incurs considerable overhead as the network size increases. Lastly, using DHTs in overlays requires two layers of routing, one for the underlay on which the overlay is created, and the second one in the overlay itself.

To solve this problem, the embodiments of the present invention present a routing protocol, Distance-based Content Routing (DCR), for ICN. With DCR, a router in ICN can create routes to contents without explicitly exchanging network topology information or physical paths in the ICN, and without the knowledge of all content locations. DCR uses an identifier with a flat or hierarchical structure to identify a respective network node (e.g., a router). A content object in a router can be requested using the name of the object. A name can be hierarchical or flat. If flat names are used, DCR provides routes to the suitable routers (e.g., nearest routers) storing specific contents identified by the flat name. On the other hand, if hierarchical naming is used, a plurality of objects can share the same name prefix, while name suffixes identify specific objects. In this disclosure, the name of a specific content object or name prefix as prefix.

DCR supports routing of content requests to a suitable anchor of a prefix, as well as to all anchors of the prefix using the same signaling for routing updates. A suitable anchor can be determined based on one or more routing metric. Examples of a routing metric include, but are not limited to, distance, hop count, bandwidth availability and utility, delay, congestion, and load on network nodes. DCR uses the same signaling for routing updates for both. A router running DCR maintains multiple loop-free routes to one or more anchors for a respective known prefix. Routers can forward requests for specific prefixes over one or multiple routes towards anchors of those prefixes. In some embodiments, distances to anchors are measured in hop counts. However, distances in DCR can be based on other types of metrics, without changing the basic approach of DCR.

A respective anchor of a prefix generates routing metric (e.g., distance) updates for the prefix periodically. An update includes a sequence number used for avoiding routing-table loops and stale routing information. DCR only allows an anchor of a prefix to change the sequence number in the updates for the prefix from the anchor. DCR orders routers for a prefix based on the identifiers of the anchors of the prefix, sequence numbers created by such anchors, and distances to these anchors. A router can select a neighbor as the next hop to the prefix only if that neighbor reports up-to-date (i.e., non-stale) route information and offer a more preferable routing metric value to the prefix (e.g., a shorter distance), or offer the same routing metric value as the current routing metric value (e.g., the same distance) for the prefix but have a smaller identifier compared to the current neighbor.

System Architecture

FIG. 1A illustrates an exemplary distance-based routing to a suitable instance of a prefix in an ICN, in accordance with an embodiment of the present invention. As illustrated in FIG. 1, an ICN 100 includes a number of routers 101-123. A respective router in ICN 100 is associated with an identifier with a flat or hierarchical structure to identify the router in ICN 100. In this example, a respective router in ICN 100 is labeled with the router's identifier. Under such a scenario, router 101 is associated with an identifier 101. Similarly, routers 102-123 are associated with identifiers 102-123, respectively.

A respective router in ICN 100, such as router 101, runs DCR for creating routes to contents without explicitly exchanging network topology information or physical paths, and without the knowledge of all content locations. Router 101 maintains multiple loop-free routes to one or more anchors for a respective known prefix. Routers can forward requests for specific prefixes over one or multiple routes towards anchors of those prefixes. A data object in a respective router in ICN 100 can be represented by a name, which can be hierarchical or flat. If flat names are used, DCR provides routes to the suitable routers (e.g., nearest routers) in ICN 100 storing specific contents identified by the flat name.

On the other hand, if hierarchical naming is used, a plurality of objects can share the same name prefix, while name suffixes identify specific objects. DCR running in a respective router in ICN 100 allows the router to advertise the name of a prefix if the corresponding object resides in the router. For example, if router 104 is advertising the prefix name "/parc/home/icn/" should store objects whose names include the prefix "/parc/home/icn/" (e.g., "/parc/home/icn/test1.txt" and "/parc/home/icn/test2.txt"), and a request for an object indicated by a name prefix, can be sent to the most suitable router that provides the best match for the name stated in the request.

Suppose that routers 104, 113, and 118 are anchors for a prefix (denoted by different line patterns). A respective anchor, such as anchor 104, generates distance updates for the prefix periodically. A distance update includes a sequence number. Only anchor 104 is allowed to update the sequence number for any distance update generated by anchor 104. This avoids routing-table loops and the use of stale routing information. Note that anchors 104, 113, and 118 can cache content opportunistically.

Upon receiving an update, DCR in a non-anchor router, such as routers 102 and 108, orders routers for a prefix based on the identifiers of the anchors of the prefix, sequence numbers created by the anchors, and distances to the anchors. For example, router 108 can be the closest to anchor 104, hence is associated with anchor 104 for the prefix. On the other hand, router 108 can have equal distances to anchors 104 and 118. Router 108 selects neighbor router 104 as the next hop to the prefix because router 104 has smaller identifier compared to the other neighbors (e.g., router 107 to anchor 118).

In the example in FIG. 1A, a link with a line pattern corresponds to a shortest path to an anchor denoted with the same line pattern. For example, the link between routers 116 and 109 is denoted with a dotted link pattern corresponding to anchor 113, and indicates that anchor 113 provides router 116 a shortest path to the prefix. Here, the term "shortest path" is used in a generic sense and refers to a path providing the most preferable routing metric value. When router 116 sends update messages to neighboring routers, the update message from router 116 indicates that anchor 113 is the designated anchor for router 116. The update message also includes the distance to anchor 113 via router 119. It is assumed that all routers have received the most-recent sequence numbers from anchors 104, 113, and 118 for the prefix.

Depending on the distribution of information, a router can store information regarding multiple anchors for the prefix. For example, router 110 can receive routing update from router 119 for anchor 104 and routing update from router 111 for anchor 113. Router 110 can store routing information toward both anchors 104 and 113. However, router 110 has a shortest path to the prefix at anchor 113. When router 110 sends update messages to neighboring routers, the update message from router 110 indicates that anchor 113 is the designated anchor for router 110. The update message also includes the distance to anchor 113 via router 111.

The links between routers in FIG. 1A also indicate the direction in which interest queries can propagate. The arrow to the lexicographically smallest next hop (i.e., the next hop with the smallest identifier) is shown with the line pattern of the corresponding anchor. This allows DCR in a respective router to operate without creating a loop. Traversing a directed path in ICN 100 terminates at anchors 104, 113, or 118 without traversing a loop. Hence, DCR in the routers, without creating a spanning tree, create a directed acyclic graph (DAG) in ICN 100 with multiple roots, each such root being an anchor (i.e., anchors 104, 113, and 118 are the roots of the DAG). One or more routers can have multiple paths to prefixes. However, because a router only advertises the route to one anchor, only a few routers may be aware of all the anchors for the prefix. Note that all links in ICN 100 can be used to forward requests for content.

Figure 1B:
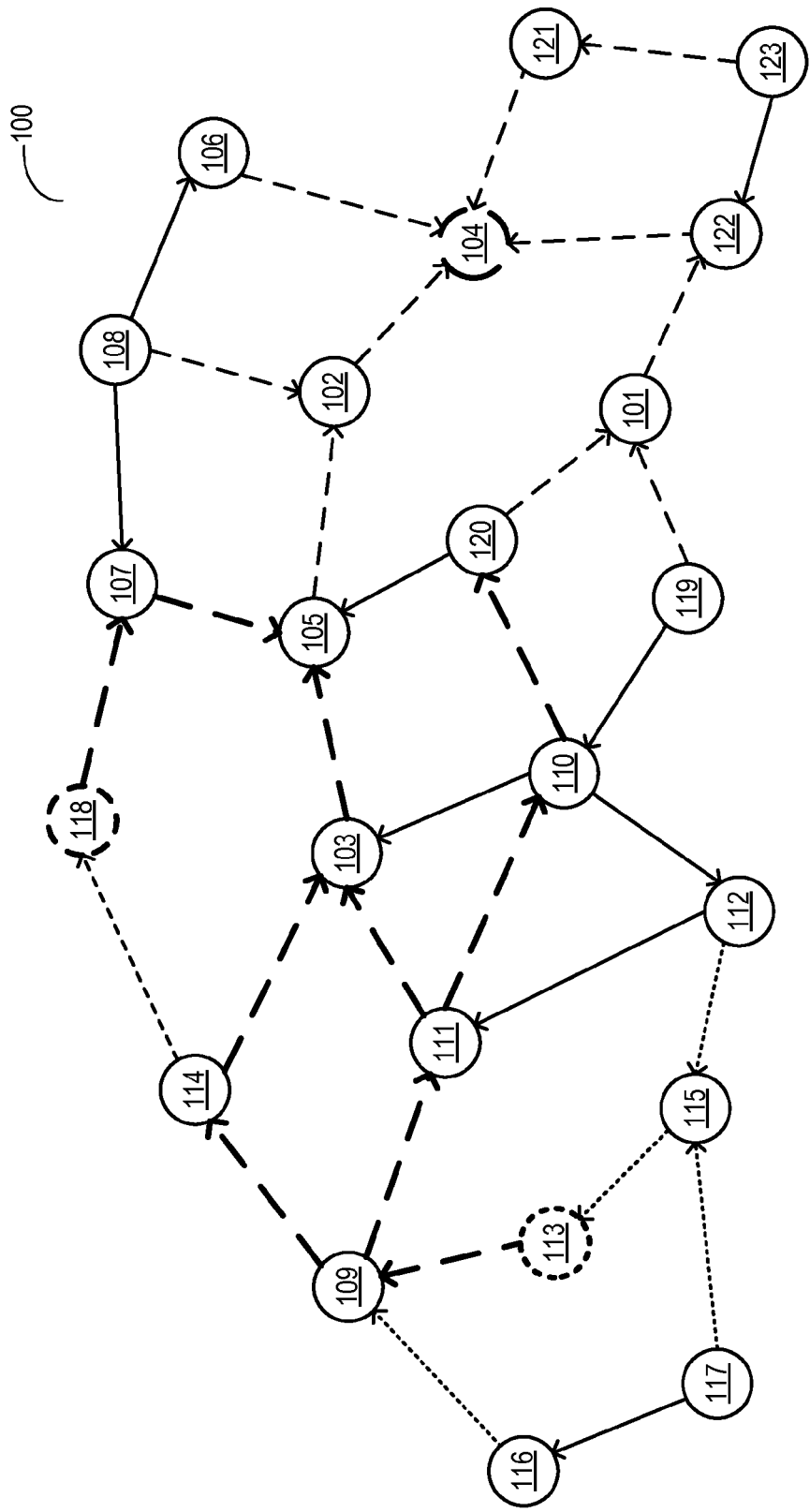
FIG. 1B illustrates exemplary distance-based routes to the root anchor of a prefix in an ICN, in accordance with an embodiment of the present invention.

FIG. 1B illustrates exemplary distance-based routes to the root anchor of a prefix in an ICN, in accordance with an embodiment of the present invention. The example in FIG. 1B shows how routing information regarding the root anchor of a prefix is propagated. Router 104 has the identifier with the smallest value among anchors 104, 113, and 118 of the prefix. Suppose that the prefix requires multipoint communication support. Routers 103, 107, and 110 have shortest paths to the prefix at anchor 104. Routers 103, 107, and 110 are also aware of other anchors with larger identifiers than anchor 104. For example, router 107 is aware of anchor 118, which has a larger identifier than anchor 104. DCR in routers 103, 107, and 110 then determine that anchor 104 should be the root anchor for the prefix based on the lexicographic order of the identifiers of the anchors.

Accordingly, routers 103, 107, and 110 send an update about anchor 104 to the best next hop to other anchor they are aware of. For example, router 107 sends an update to router 118 (which is also an anchor), router 103 sends an update to routers 111 and 114, and router 110 sends an update to 111. A respective router receiving an update about anchor 104 being the root anchor sends an update to each best next hop toward a respective other anchor that router knows. This way, updates about anchor 104 reach the other two anchors of the prefix (anchors 113 and 118).

In FIG. 1B, the links denoted with high line weights (e.g., the link between routers 110 and 111) indicate the links over which updates indicating anchor 104 as the root anchor of the prefix propagate. These links are part of the preferred shortest path to a known anchor. For example, the link between routers 110 and 111 is part of the preferred shortest path from router 110 to another anchor 113. On the other hand, the links denoted with the same line pattern as the links with high line weights, such as the link between routers 102 and 105, indicate the links over which routing updates propagate for the prefix with anchor 104 being the designated anchor (e.g., the anchor with smallest hop count). A number of routers (e.g., routers 112, 113, 115, 116, 117, and 118) do not participate in the propagation of updates indicating anchor 104 as the root anchor of the prefix. Furthermore, some routers (e.g., routers 112, 115, 116, and 117) do not receive updates about anchor 104 being the root anchor of the prefix. This preclusion contrasts with the traditional approach of building shared multicast trees, in which all routers typically have a route to anchor 104.

Figure 1C:
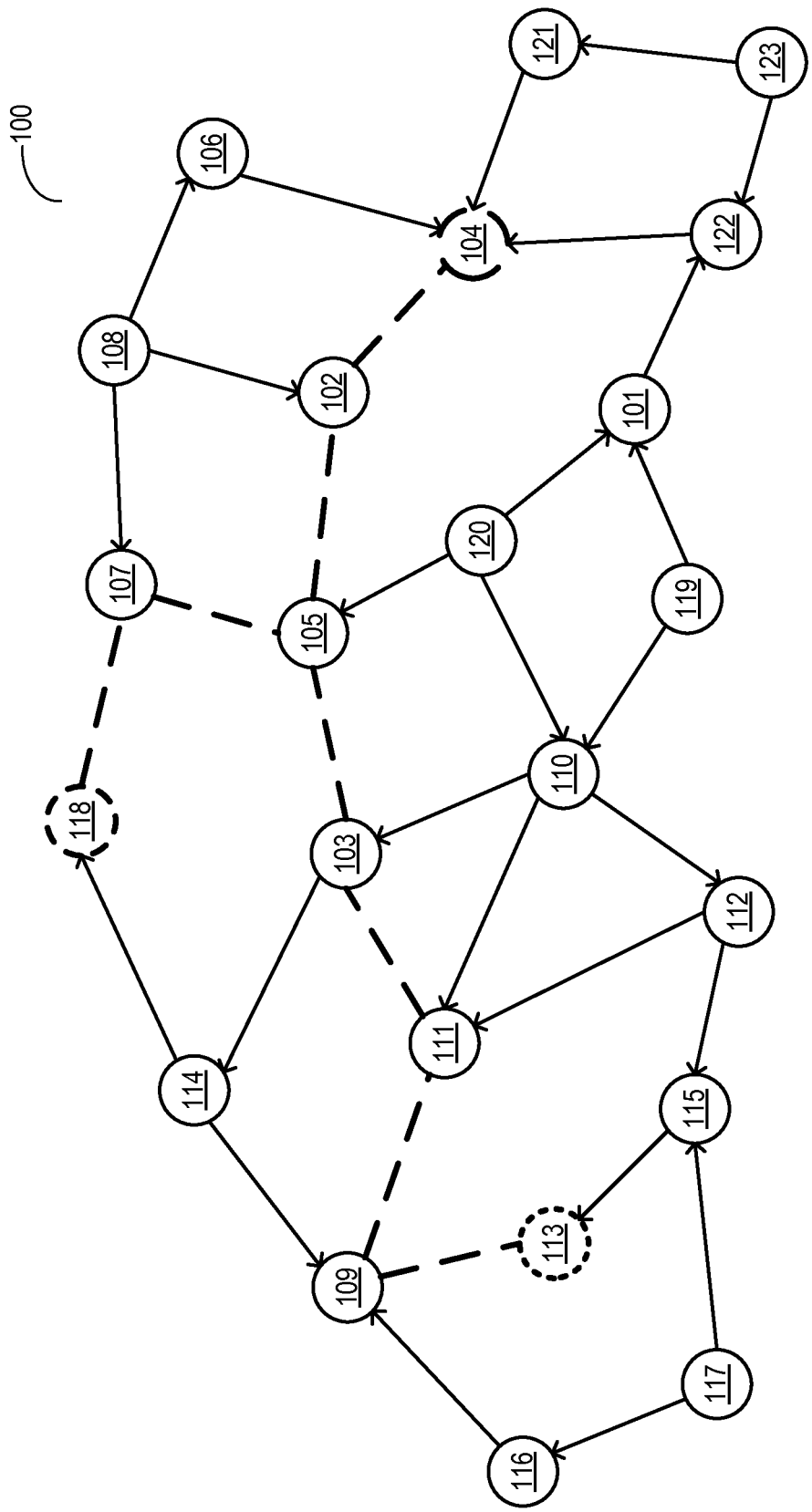
FIG. 1C illustrates an exemplary anchor-based tree (ABT) comprising all instances of a prefix in an ICN, in accordance with an embodiment of the present invention.

FIG. 1C illustrates an exemplary anchor-based tree (ABT) comprising all instances of a prefix in an ICN, in accordance with an embodiment of the present invention. The example in FIG. 1C shows how the ABT is formed for the prefix. Anchors 113 and 118 send their respective join requests toward root anchor 104 to join the ABT of the prefix. In some embodiments, anchors 113 and 118 become aware of anchor 104 as the root anchor based on the received updates associated with anchor 104, as described in conjunction with FIG. 1B. To forward a content request that should be sent to all anchors of a prefix (e.g., video conferencing), a router in ICN 100 simply forwards the request toward one of the anchors of the prefix. When a router in the ABT receives the request, the router broadcasts the request over the ABT of the prefix.

In some embodiments, the broadcast mechanism within an ABT is based on a shared-tree multicast routing protocol. Establishing the ABT of a prefix in ICN 100 does not require a router to be aware of all the anchors of the prefix. The routers in the shortest paths between the anchors and the root anchor participate in the signaling needed to build the ABT.

Information Stored by DCR

A respective router running DCR maintains three main tables: (i) a neighbor table storing routing information reported by a respective neighbor router for a respective prefix; (ii) a routing table storing routing information for a respective known prefix; and (iii) a multipoint routing table storing routing information regarding ABTs created for the prefixes requiring multipoint communication support.

Figure 2A:
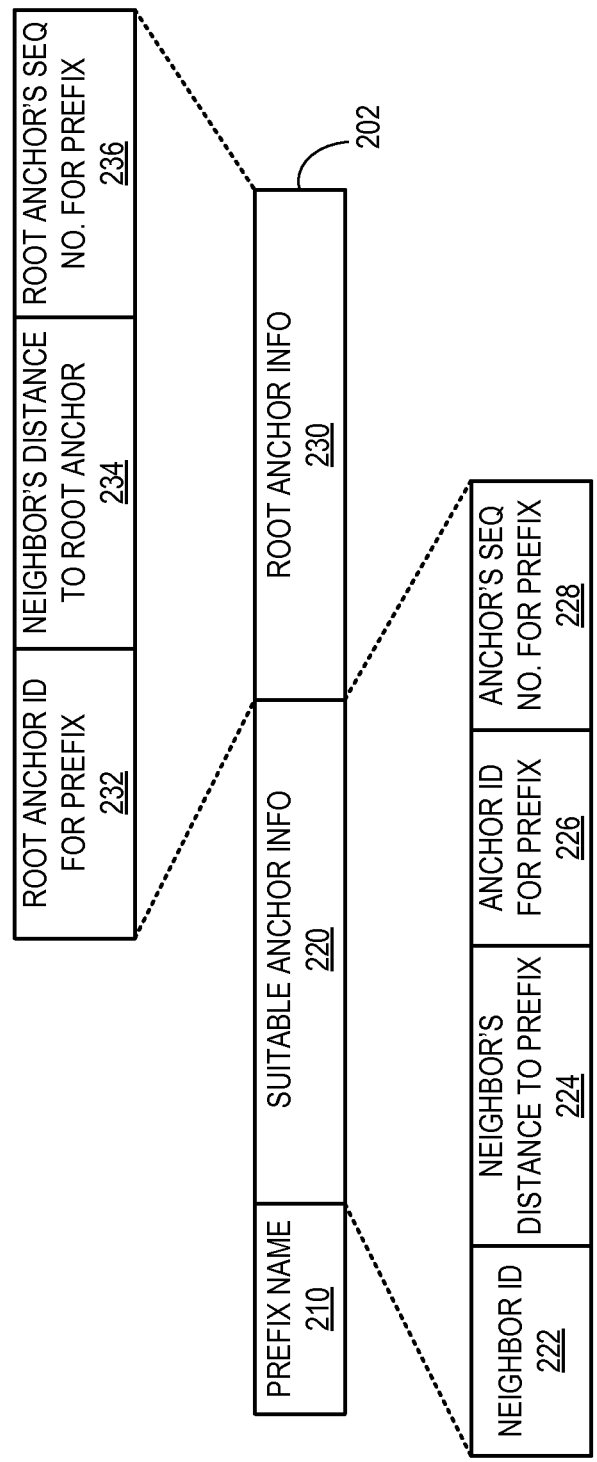
FIG. 2A illustrates an exemplary neighbor table for storing routing information reported by a respective valid neighbor for a respective prefix, in accordance with an embodiment of the present invention.

FIG. 2A illustrates an exemplary neighbor table for storing routing information reported by a respective valid neighbor for a respective prefix, in accordance with an embodiment of the present invention. A respective row of a neighbor table 202 corresponds to a prefix. The row includes a prefix name 210, suitable anchor information 220 comprising routing information reported by a neighbor regarding the most suitable anchor for the prefix (e.g., the nearest anchor to the prefix), and root anchor information 230 for the prefix. Suitable anchor information 220 includes a neighbor identifier 222 of the neighbor which reports routing information regarding the suitable anchor. Suitable anchor information 220 also includes the neighbors distance to the prefix 224, an identifier 226 of the anchor for the prefix reachable via the neighbor, and the anchor's sequence number 228 for the prefix. Root anchor information 230 includes a root anchor identifier 232 for the prefix, distance 234 from the neighbor to the root anchor, and the root anchor's sequence number 236 for the prefix.

FIG. 2B illustrates an exemplary routing table for storing routing information for a respective known prefix, in accordance with an embodiment of the present invention. A respective row of a routing table 204 corresponds to a prefix. The row includes the prefix name 210, routing update information 240 for the prefix, neighbor list 250 for the prefix, and an anchor list 260 for the prefix. Neighbor list 250 includes the valid next hop neighbors via which the prefix is reachable. Anchor list 260 includes information reported by any next-hop neighbor regarding a respective anchor. Such information includes an anchor identifier 262 and the anchor's sequence number 264 for the prefix.

Routing update information 240 includes an update-pending flag 241, which indicates whether update information needs to be sent to a neighbor, and a number 242 indicating the number of next-hop neighbors. Number 242 indicates the number of valid next hops to the prefix. Routing update information 240 also includes the ordered distance 243 from the router to the prefix, the current distance 244 to the prefix, an identifier 245 of the designated anchor, and the designated anchor's sequence number 246 for the prefix. The designated anchor is the anchor of the prefix to which a router forwards an interest for the prefix. In some embodiments, the designated anchor is the anchor of the prefix which has the smallest identifier among those that offer the shortest distance to the prefix. In the example in FIG. 1A, anchor 104 is the designated anchor for router 106.

FIG. 2C illustrates an exemplary multipoint routing table for storing routing information for prefixes requiring multipoint support based on ABTs, in accordance with an embodiment of the present invention. A respective row of a multipoint routing table 206 corresponds to a prefix. The row includes the prefix name 210, multipoint update information 270 for the prefix, and neighbor list 280 for the prefix in the corresponding ABT, as described in conjunction with FIG. 1C. Multipoint update information 270 includes the prefix's root anchor's identifier 272, the distance to the root anchor 274 from the router storing multipoint routing table 206, and the root anchor's sequence number 276 created by for the prefix.

Updating the Neighbor Table

Upon receiving an update message for a prefix, a router updates its neighbor table. This update message can also indicate an input event affecting the information in a neighbor table. An update message for the prefix includes the name of the prefix, the distance to the prefix, an anchor for the prefix, and the anchor's sequence number for the prefix. The router stores in the neighbor table the new information reported in the message if update message includes an up-to-date sequence number generated by the reported anchor of the prefix.

Figure 3A:
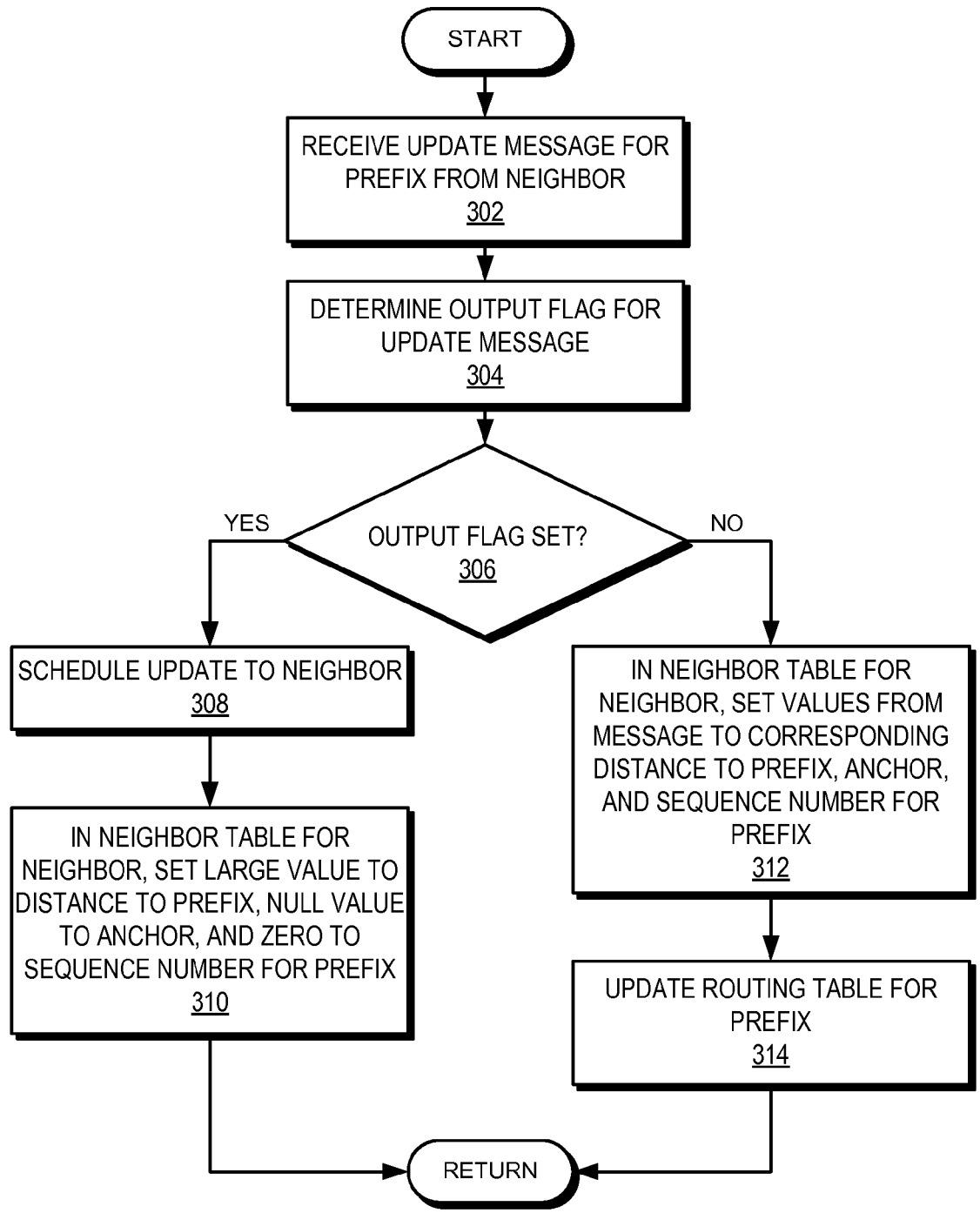
FIG. 3A presents a flowchart illustrating the process of a router updating the neighbor table for a prefix, in accordance with an embodiment of the present invention.

FIG. 3A presents a flowchart illustrating the process of a router updating the neighbor table for a prefix, in accordance with an embodiment of the present invention. Upon receiving an update message for the prefix from a neighbor (operation 302), the router determines an output flag for the update message (operation 304), as described in conjunction with FIG. 3B. The router then checks whether the output flag is set (operation 306). In some embodiments, a set flag indicates that the value "1" is assigned to the flag. If the flag is implemented in hardware, the bit corresponding to the flag can be set to "1." Similarly, an unset flag indicates that the value "0" is assigned to the flag.

If the output flag is set, the router schedules an update to the neighbor (operation 308) and, in the row corresponding to the neighbor the neighbor table, sets a large value (e.g., infinity) to the distance to the prefix, null value to the anchor, and zero to the sequence number for the prefix (operation 310). If the output flag is not set, the router, in the row corresponding to the neighbor the neighbor table, sets values from the message to corresponding distance to the prefix, the anchor, and the sequence number for the prefix (operation 312), and updates the routing table for the prefix (operation 314), as described in conjunction with FIGS. 4A-4D.

Figure 3B:
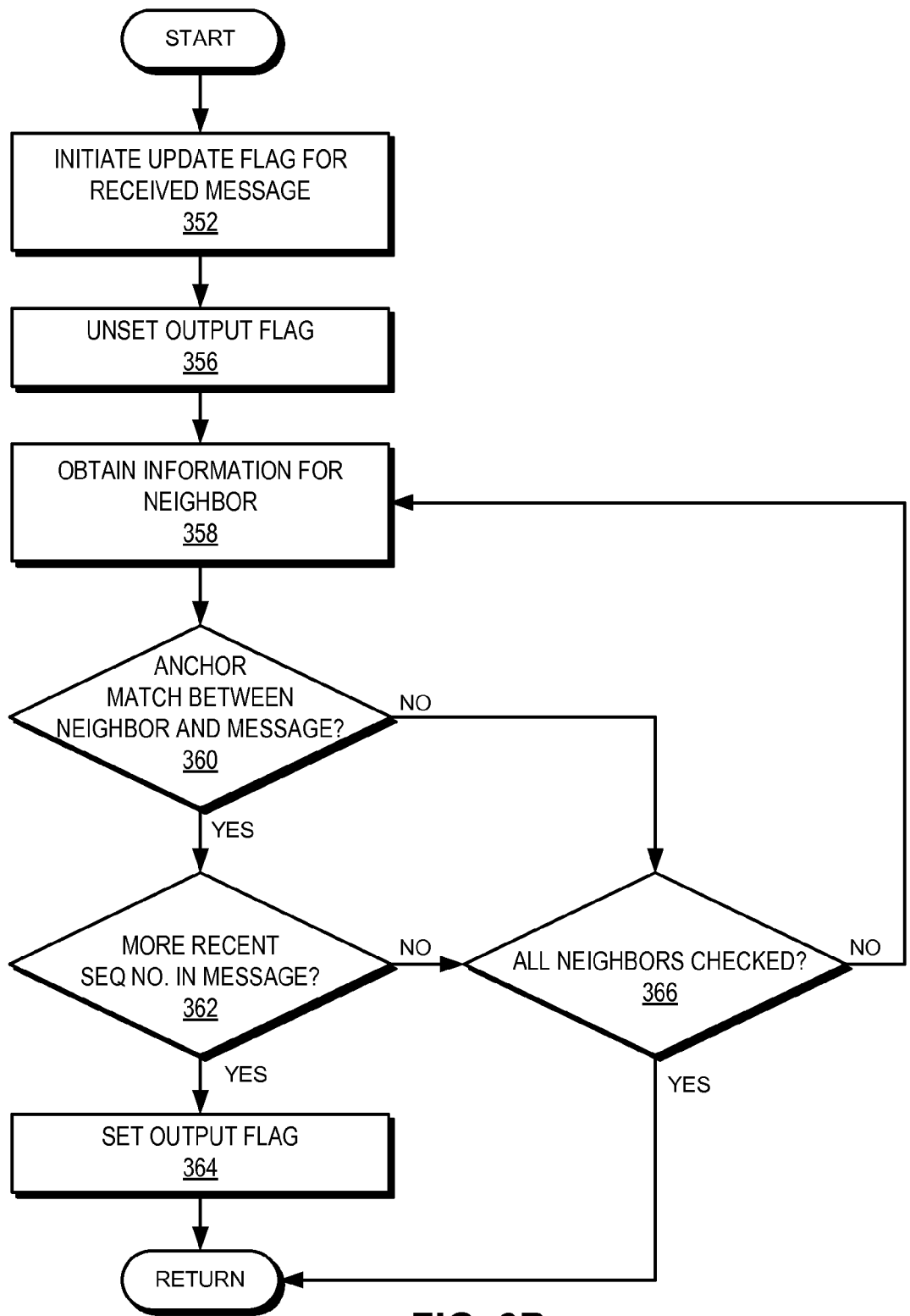
FIG. 3B presents a flowchart illustrating the process of a router checking validity of an update message, in accordance with an embodiment of the present invention.

FIG. 3B presents a flowchart illustrating the process of a router checking validity of an update message, in accordance with an embodiment of the present invention. Operations in FIG. 3B correspond to operation 304 of FIG. 3A. During operation, the router initiates an update flag for the received message (operation 352) and unsets the update flag (operation 356). The router then obtains information from the neighbor table for a neighbor (operation 358) and checks whether the neighbor's anchor identifier matches with the anchor identifier in the message (operation 360).

If the anchor identifiers match, the router checks whether the more recent sequence number is in the message (operation 362). If the anchor identifiers match and the more recent sequence number is in the message, the router sets the output flag (operation 364). If the anchor identifiers do not match or the message does not include the recent sequence number, the router checks whether the router has checked all neighbors (operation 366). If the router has not checked all neighbors, the router obtains information from the neighbor table for another neighbor (operation 358) and continues to check whether the other neighbor's anchor identifier matches with the anchor identifier in the message (operation 360).

Updating the Routing Table

While updating the routing table, a router determines which neighbors report valid sequence numbers and, from those neighbors, selects those neighbors that can be the next hops for the prefix. This prevents routing-table loops by enforcing a lexicographic ordering between the router and its neighbors (e.g., a router can only forward a request to a neighbor with a smaller identifier). If at least one neighbor is found that satisfies the requirements, and any changes are made to the neighbor's distance, anchor, or sequence number, the router schedules an update.

Figure 4A:
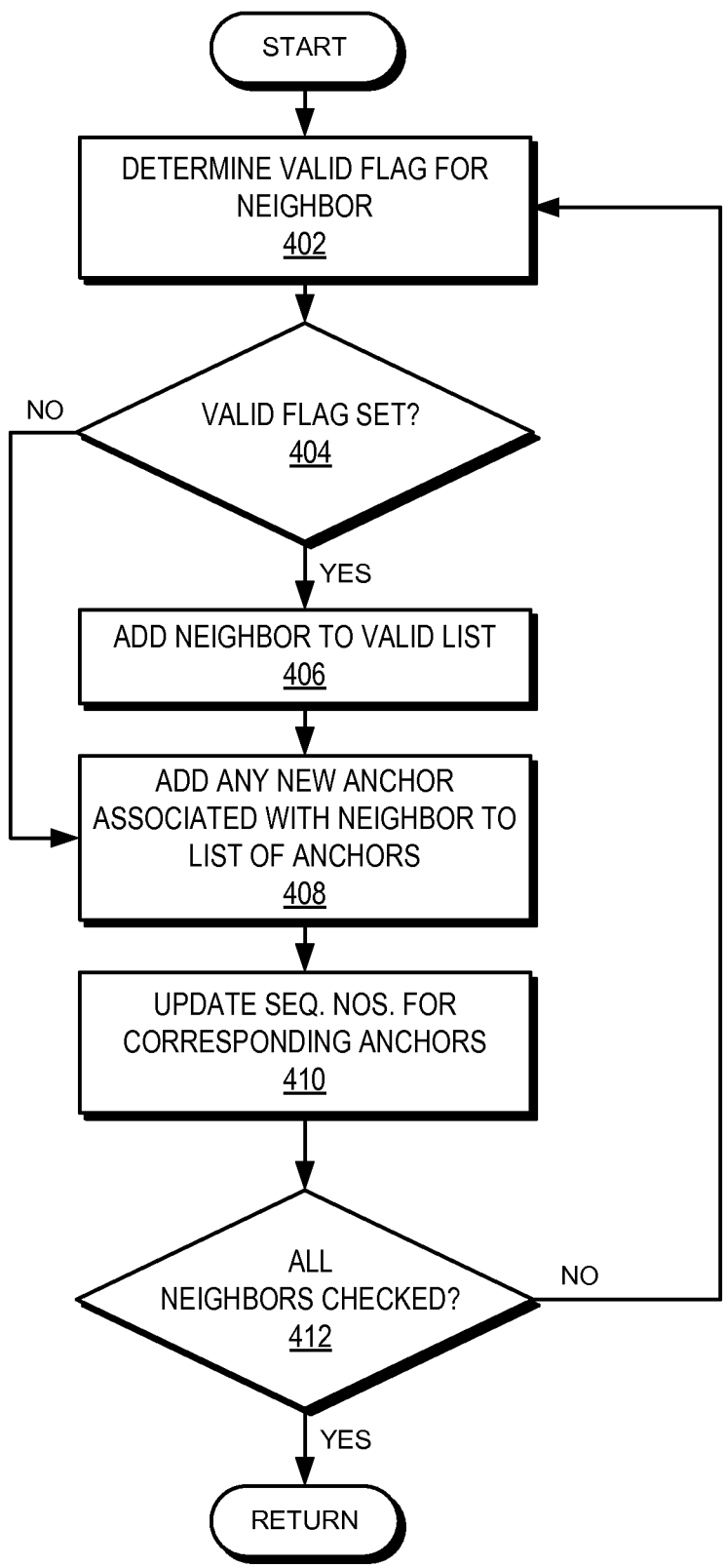
FIG. 4A presents a flowchart illustrating the process of a router storing valid new anchors and corresponding sequence numbers for updating the routing table for a prefix, in accordance with an embodiment of the present invention.

FIG. 4A presents a flowchart illustrating the process of a router storing valid new anchors and corresponding sequence numbers for updating the routing table for a prefix, in accordance with an embodiment of the present invention. During operation, the router determines a valid flag for a neighbor (operation 402), as described in conjunction with FIG. 4B. The router then checks whether the valid flag is set (operation 404). If the valid flag is set, the router adds the neighbor to a valid list (operation 406). The valid list includes the neighbors that have reported a valid sequence number. If the valid flag is not set (operation 404) or the neighbor has been added to the valid list (operation 406), the router adds any new anchor associated with the neighbor to the list of anchors for the prefix in the routing table (operation 408). The router then updates the sequence numbers in the routing table for corresponding anchors (operation 410) and checks whether all neighbors have been checked (operation 412). If all neighbors have not been checked, the router continues to determine a valid flag for another neighbor (operation 402).

Figure 4B:
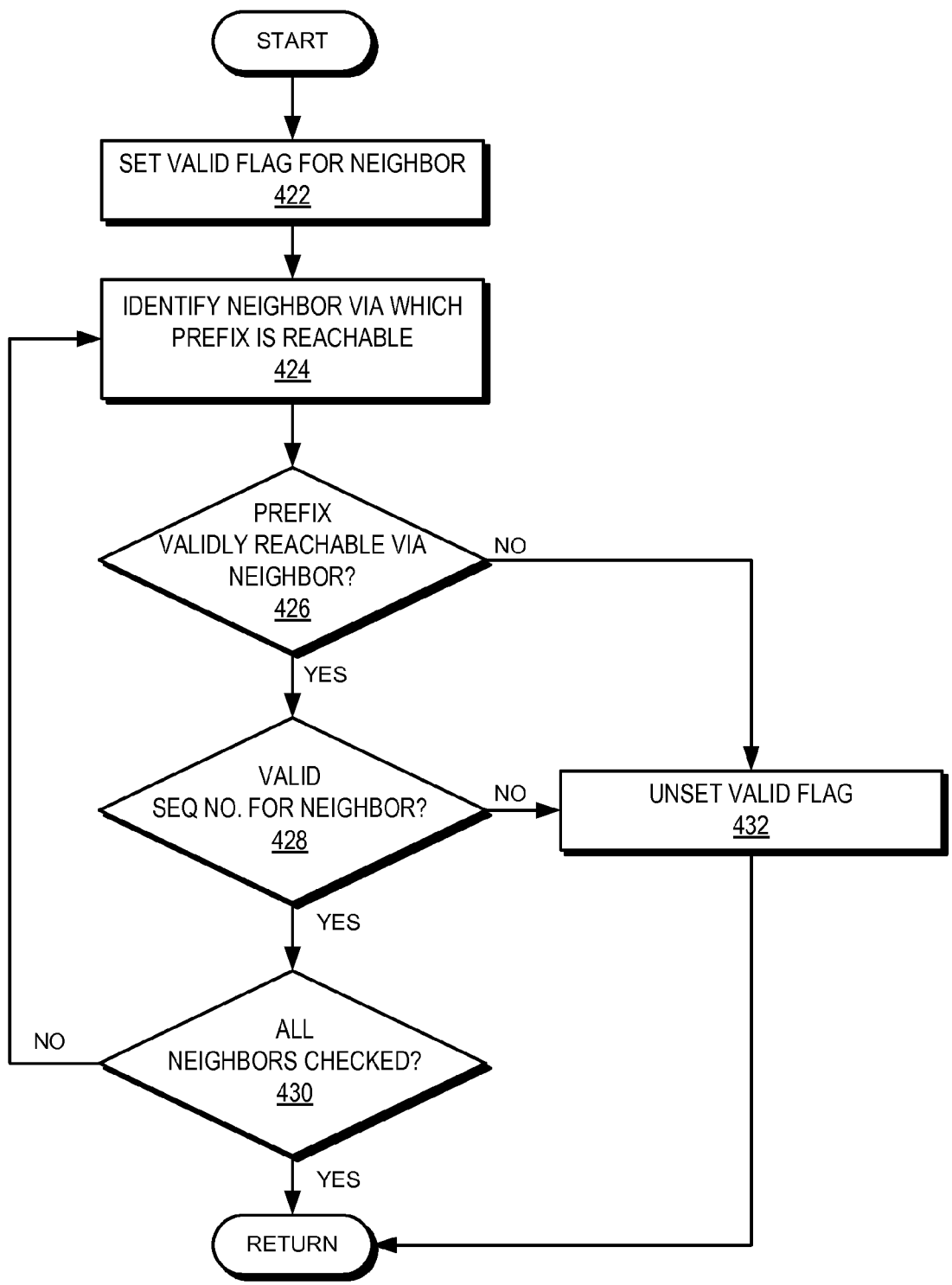
FIG. 4B presents a flowchart illustrating the process of a router identifying neighbors reporting valid sequence number for updating the routing table for a prefix, in accordance with an embodiment of the present invention.

FIG. 4B presents a flowchart illustrating the process of a router identifying neighbors reporting valid sequence number for updating the routing table for a prefix, in accordance with an embodiment of the present invention. Operations in FIG. 4B correspond to operation 402 of FIG. 4A. During operation, the router sets a valid flag for the neighbor (operation 422) and identifies a neighbor via which the prefix is reachable (operation 424). The router then checks whether the prefix is validly reachable via the identified neighbor (operation 426). In some embodiments, the router determines a prefix validly reachable via a neighbor based on lexicographic order of the identifiers of the routers.

If the prefix is validly reachable via the neighbor, the router checks whether the neighbor is reporting a valid sequence number for the anchor (operation 428). In some embodiments, if the ordered distance is set (i.e., not an arbitrary large number, such as infinity), the sequence number is valid if the number is less than or equal to the current sequence number for the neighbor. If the ordered distance is not set, the sequence number is valid if the number is less than the current sequence number for the neighbor.

If the prefix is validly reachable via the neighbor and the neighbor is reporting a valid sequence number for the anchor, the routers checks whether the router has checked all neighbors (operation 430). If the prefix is not validly reachable via the neighbor or the neighbor is not reporting a valid sequence number for the anchor, the router unsets the valid flag (operation 432). If the router has not checked all neighbors, the router identifies another neighbor via which the prefix is reachable (operation 424) and continues to check whether the prefix is validly reachable via the neighbor (operation 426).

Figure 4C:
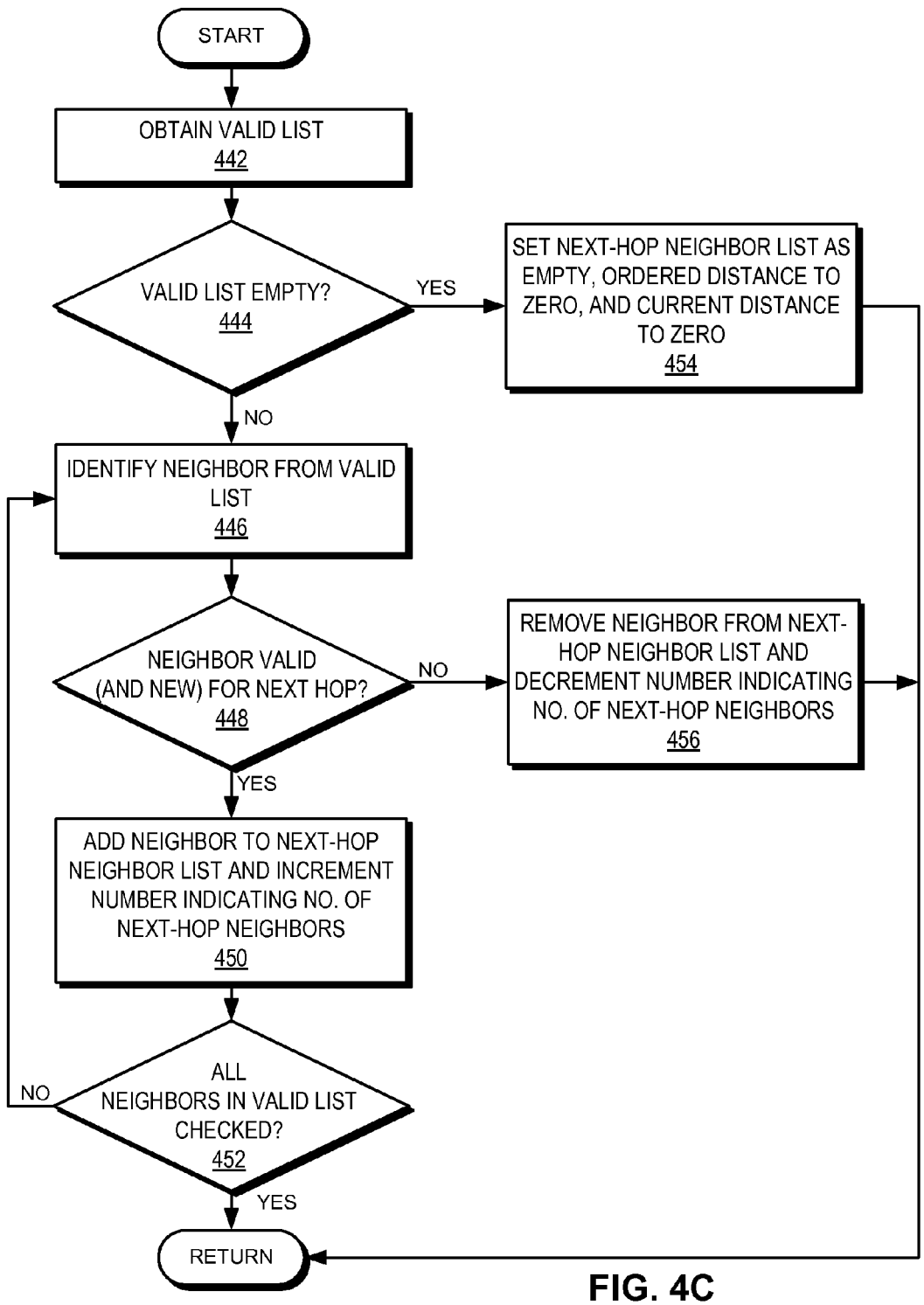
FIG. 4C presents a flowchart illustrating the process of a router storing valid next-hop routers and corresponding distances for updating the routing table for a prefix, in accordance with an embodiment of the present invention.

FIG. 4C presents a flowchart illustrating the process of a router storing valid next-hop routers and corresponding distances for updating the routing table for a prefix, in accordance with an embodiment of the present invention. During operation, the router obtains a valid list (operation 442) and checks whether the valid list is empty (operation 444). If so, the router sets the next-hop neighbor list in the routing table as empty, and the ordered and current distances in the routing table to zero (operation 454) for the prefix. If the valid list is not empty, the router identifies a neighbor from a valid list (operation 446) and checks whether the neighbor is valid for the next hop (operation 448). In some embodiments, the router also checks whether the neighbor is a new next-hop neighbor.

If the neighbor is valid (and new) for the next hop, the router adds the neighbor to a next-hop neighbor list and increments a number indicating the number of next-hop neighbors (operation 450) for the prefix (e.g., number 242 in FIG. 2B). The router then checks whether the router has checked all neighbors in the valid list (operation 452). If the router has not checked all neighbors in the valid list, the router identifies another neighbor from the valid list (operation 448) and continues to check whether the neighbor is valid for the next hop (operation 426). If the neighbor is not valid for the next hop, the router removes the neighbor from the next-hop neighbor list and decrements the number indicating the number of next-hop neighbors (operation 456).

In some embodiments, a neighbor can become a valid next hop to the prefix if one of the two following conditions is met. The first condition is for a router which has at least one neighbor as a next hop to the prefix. Only those neighbors reporting the most recent sequence numbers from the known anchors of the prefix can be considered as next hops, and these neighbors are ordered lexicographically based on their distances to the prefix and their respective identifiers. The router can select a neighbor from the set of neighbors reporting the most recent sequence numbers for the prefix if either the neighbor has a better routing metric value for the prefix (e.g., has a shorter distance to the prefix) than the router, or has the same value but the neighbor's identifier is smaller than the identifier of router. The second condition is for a router that has no next hops to the prefix. A neighbor can be considered as a next hop to the prefix only if the neighbor reports a finite routing metric value to the prefix, has the smallest routing metric value for the prefix among all neighbors, and either reports a more recent sequence number from a known anchor of the prefix or is a new anchor.

Figure 4D:
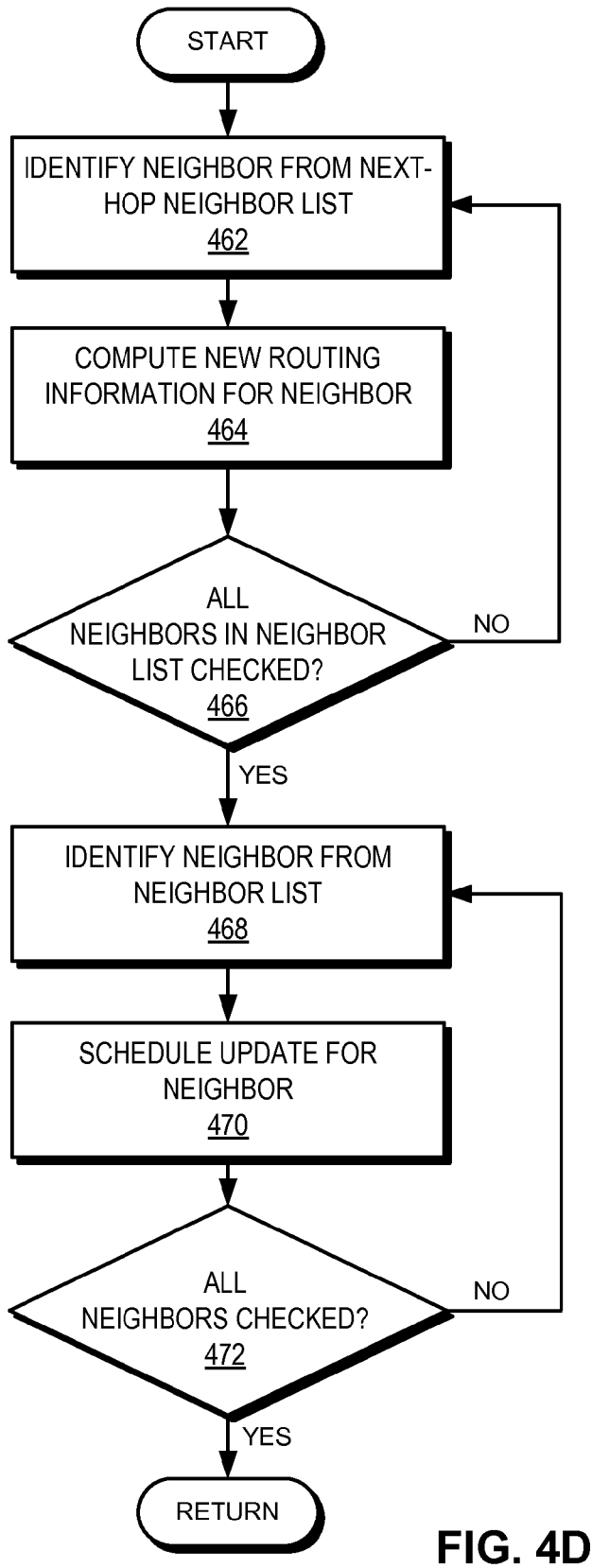
FIG. 4D presents a flowchart illustrating the process of a router computing new routing information and scheduling corresponding updates for updating the routing table for a prefix, in accordance with an embodiment of the present invention.

FIG. 4D presents a flowchart illustrating the process of a router computing new routing information and scheduling corresponding updates for updating the routing table for a prefix, in accordance with an embodiment of the present invention. During operation, the router identifies a neighbor from the next-hop neighbor list (operation 462) and computes new routing information for the neighbor (operation 464). The router then checks whether the router has checked all neighbors in the neighbor list (operation 466). If the router has not checked all neighbors in the next-hop neighbor list, the router identifies another neighbor from the next-hop neighbor list (operation 462) and continues to compute new routing information for the neighbor (operation 464).

If the router has checked all neighbors in the next-hop neighbor list, the router identifies a neighbor from the neighbor list (operation 468) and schedules update for the neighbor (operation 470). The router then checks whether the router has checked all neighbors in the neighbor list (operation 472). If the router has not checked all neighbors in the next-hop neighbor list, the router identifies another neighbor from the neighbor list (operation 488) and continues to schedule update for the neighbor (operation 464).

Exemplary System

Figure 5:
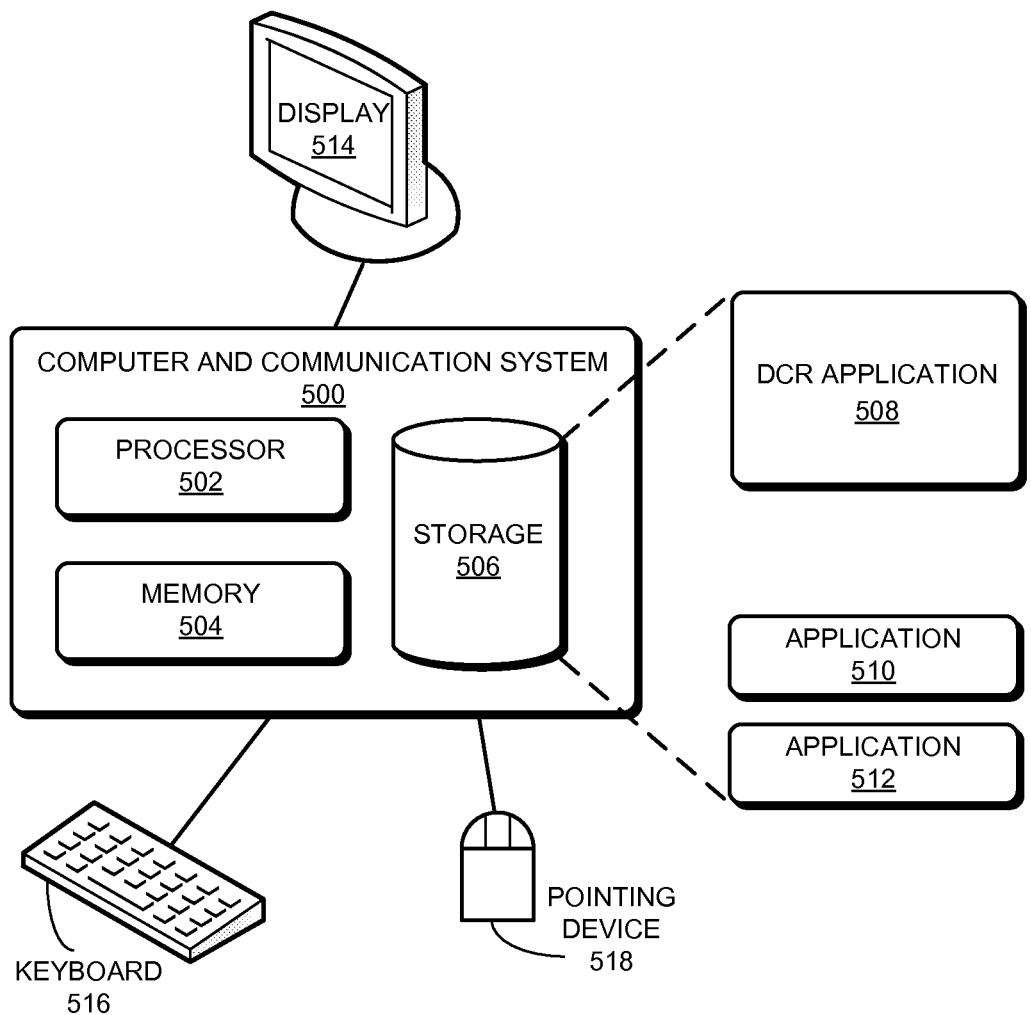
FIG. 5 illustrates an exemplary computer and communication system in an ICN, in accordance with an embodiment of the present invention.

FIG. 5 illustrates an exemplary computer and communication system in an ICN, in accordance with an embodiment of the present invention. In one embodiment, a computer and communication system 500 operates as a network node in the ICN. Computer and communication system 500 includes a processor 502, a memory 504, and a storage device 506. Storage device 506 stores a DCR application 508, as well as other applications, such as applications 510 and 512. During operation, DCR application 508 is loaded from storage device 506 into memory 504 and then executed by processor 502. While executing the program, processor 502 performs the aforementioned functions. Computer and communication system 500 is coupled to an optional display 514, keyboard 516, and pointing device 518. In some embodiments, DCR application 508 can be executed on a plurality of computer and communication systems, which are able to exchange data that describes the state of the operation associated with DCR application 508.

Note that the above-mentioned modules can be implemented in hardware as well as in software. In one embodiment, these modules can be embodied in computer-executable instructions stored in a memory which is coupled to one or more processors in computer and communication system 500. When executed, these instructions cause the processor(s) to perform the aforementioned functions.

In summary, embodiments of the present invention provide a computer system and a method for distance-based routing in an ICN. In one embodiment, the computing system includes a processor and a computer-readable storage medium. The computer-readable storage medium stores instructions which when executed by the processor cause the processor to perform a method. The method comprises identifying an identifier of a first anchor node associated with a name in an update message received from a neighbor node. The first anchor node stores a content object identifiable based on the name, which is independent of the first anchor node. The method also comprises determining a valid next-hop neighbor in the ICN for the name based on a sequence number of the update message generated by the first anchor node and lexicographic order of an identifier of the neighbor node; and determining whether the first anchor node is a designated anchor node based on the validity of the next-hop neighbor and a routing metric for the first anchor node.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer-executable method, comprising:
   receiving, by a local computer node, an update message for a name prefix from a first neighboring node in an information-centric network (ICN), wherein the update message includes an updated sequence number for a first anchor node for the name prefix that stores a Content Object identifiable based on a name that includes the name prefix, and wherein the name prefix is location-independent:
   identifying a first set of neighboring nodes, which are neighbors to the local computer node, via which the name prefix of the first anchor node is reachable;
   determining, from the first set of neighboring nodes, a second set of neighboring nodes which are valid neighbors to the local computer node for the name prefix based on their sequence numbers being most recent sequence numbers matching the updated sequence number information from the update message:
   computing new routing information for a plurality of neighbors from the second set of neighboring nodes for the name prefix;
   updating, by the local computer node, a routing table with new routing information for the plurality of neighbors from the second set of neighboring nodes for the name prefix; and
   responsive to receiving a request that includes a location-independent name comprising the name prefix, forwarding a request received over the ICN for a Content Object with the name prefix to a neighbor with smallest lexicographic ordering identifier in the ICN, based on the routing table with the new routing information.

2. The method of claim 1, wherein a routing metric for the first anchor node is equal to a routing metric for a second anchor node of the name and where the method further comprises:
   determining whether the first anchor node is a designated anchor node based on lexicographic order of first identifier of the first anchor node compared to a second identifier of the second anchor node.

3. The method of claim 1, further comprising forwarding the update message from the first anchor node to a second neighbor node based on lexicographic order of a second identifier of the second neighbor node.

4. The method of claim 1, further comprising:
   determining that the first anchor node is not a designated anchor node; and
   precluding the local computer node from forwarding the update message from the first anchor node to a neighbor node.

5. The method of claim 1, in response to determining that the Content Object requires a multipoint communication, the method further comprises determining the first anchor node to be a root anchor node of the name based on lexicographic order of a first identifier of the first anchor node compared to a second identifier of a second anchor node of the name, wherein the second anchor node of the name is locally known.

6. The method of claim 5, further comprising forwarding an update message indicating the first anchor node as the root node to a neighbor node, wherein a suitable path to the second anchor node is via the neighbor node, and wherein the update message comprises route information toward the first anchor node.

7. The method of claim 5, further comprising:
   maintaining an anchor-based tree (ABT) rooted at the first anchor node for the name; and
   forwarding a request from the second anchor node for joining the ABT to the first anchor node.

8. The method of claim 7, further comprising broadcasting a request for the Content Object via the ABT.

9. A non-transitory computer-readable storage medium storing instructions that when executed by a computer cause the computer to perform a method for performing distance-based routing in an information-centric network (ICN), the method comprising:
   receiving, by a local computer node, an update message for a name prefix from a first neighboring node in an information-centric network (ICN), wherein the update message includes an updated sequence number information for a first anchor node for the name prefix that stores a Content Object identifiable based on a name that includes the name prefix, and wherein the name prefix is location-independent;
   identifying a first set of neighboring nodes, which are neighbors to the local computer node, via which the name prefix of the first anchor node is reachable;
   determining, from the first set of neighboring nodes, a second set of neighboring nodes which are valid neighbors to the local computer node for the name prefix based on their sequence numbers being most recent sequence numbers matching the updated sequence number information from the update message:
   computing new routing information for a plurality of neighbors from the second set of neighboring nodes for the name prefix;
   updating, by the local computer node, a routing table with new routing information for the plurality of neighbors from the second set of neighboring nodes for the name prefix; and
   responsive to receiving a request that includes a location-independent name comprising the name prefix, forwarding a request received over the ICN for a Content Object with the name prefix to a neighbor with smallest lexicographic ordering identifier in the ICN, based on the routing table with the new routing information.

10. The non-transitory computer-readable storage medium of claim 9, wherein a routing metric for the first anchor node is equal to a routing metric for a second anchor node of the name, further comprising:
    determining whether the first anchor node is a designated anchor node based on lexicographic order of a first identifier of the first anchor node compared to a second identifier of the second anchor node.

11. The non-transitory computer-readable storage medium of claim 9, wherein the method further comprises forwarding the update message from the first anchor node to a second neighbor node based on lexicographic order of a second identifier of the second neighbor node.

12. The non-transitory computer-readable storage medium of claim 9, further comprising determining that the first anchor node is not a designated anchor node; and precluding the local computer node from forwarding the update message from the first anchor node to a neighbor node.

13. The non-transitory computer-readable storage medium of claim 9, in response to determining that the Content Object requires a multipoint communication, the method further comprises determining the first anchor node to be a root anchor node of the name based on lexicographic order of a first identifier of the first anchor node compared to a second identifier of a second anchor node of the name, wherein the second anchor node of the name is locally known.

14. The non-transitory computer-readable storage medium of claim 13, the method further comprises forwarding an update message indicating the first anchor node as the root node to a neighbor node, wherein a suitable path to the second anchor node is via the neighbor node, and wherein the update message comprises route information toward the first anchor node.

15. The non-transitory computer-readable storage medium of claim 13, the method further comprises:
    maintaining an anchor-based tree (ABT) rooted at the first anchor node for the name; and
    forwarding a request from the second anchor node for joining the ABT to the first anchor node.

16. The non-transitory computer-readable storage medium of claim 15, the method further comprises broadcasting a request for the Content Object via the ABT.

17. An apparatus for performing distance-based routing in an information-centric network (ICN) comprising:
    one or more processor;
    a memory;
    a message processing mechanism configured to receive, at a local computer node, an update message for a name prefix from a first neighboring node in an information-centric network (ICN), wherein the update message includes updated sequence number information for a first anchor node for the name prefix that stores a Content Object identifiable based on a name that includes the name prefix, and wherein the name prefix is location-independent; and
    a forwarding mechanism configured to:
    identify a first set of neighboring nodes, which are neighbors to the local computer node, via which the name prefix of the first anchor node is reachable:
    determine, from the first set of neighboring nodes, a second set of neighboring nodes which are valid neighbors to the local computer node for the name prefix based on their sequence numbers being most recent sequence numbers matching the updated sequence number information from the update message;
    compute new routing information for a plurality of neighbors from the second set of neighboring nodes for the name prefix;
    update, by the local computer node, a routing table with new routing information for the plurality of neighbors from the second set of neighboring nodes for the name prefix; and
    responsive to receiving a request that includes a location-independent name comprising the name prefix, forward a request received over the ICN for a Content Object with the name prefix to a neighbor with smallest lexicographic ordering identifier in the ICN, based on the routing table with the new routing information.

18. The apparatus of claim 17, wherein a routing metric for the first anchor node is equal to a routing metric for a second anchor node of the name;
    wherein the forwarding mechanism is configured to determine whether the first anchor node is a designated anchor node based on lexicographic order of a first identifier of the first anchor node compared to a second identifier of the second anchor node.

19. The apparatus of claim 17, further comprising a notification mechanism configured to forward the update message from the first anchor node to a second neighbor node based on lexicographic order of a second identifier of the second neighbor node.

20. The apparatus of claim 17, further comprising a notification mechanism configured to determine that the first anchor node is not a designated anchor node and preclude the apparatus from forwarding the update message from the first anchor node to a neighbor node.

21. The apparatus of claim 17, further comprising a multipoint communication mechanism configured to, in response to determining that the Content Object requires a multipoint communication, determine the first anchor node to be a root anchor node of the name based on lexicographic order of a first identifier of the first anchor node compared to a second identifier of a second anchor node of the name, wherein the second anchor node of the name is locally known.

22. The apparatus of claim 21, further comprising a notification mechanism configured to forward an update message indicating the first anchor node as the root node to a neighbor node, wherein a suitable path to the second anchor node is via the neighbor node, and wherein the update message comprises route information toward the first anchor node.

23. The apparatus of claim 21, wherein the multipoint communication mechanism is further configured to maintain an anchor-based tree (ABT) rooted at the first anchor node for the name; and
    wherein the apparatus further comprises a notification mechanism configured to forward a request from the second anchor node for joining the ABT to the first anchor node.

24. The apparatus of claim 23, wherein the notification mechanism is further configured to broadcast a request for the Content Object via the ABT.

* * * * *